C. C. RICH.

CLUTCH.

APPLICATION FILED MAY 6, 1911.

Reissued June 20, 1911. 13,260.

Witnesses

W. H. Moore

Juana M. Fallin

Inventor

C. C. Rich.

By H. A. Stacey, Attorney.

UNITED STATES PATENT OFFICE.

CHARLES CLAYTON RICH, OF MOUNT VERNON, NEW YORK, ASSIGNOR TO THE HYDRO-KINETIC TRANSMISSION COMPANY, OF MOUNT VERNON, NEW YORK, A CORPORATION OF MAINE.

CLUTCH.

13,260. Specification of Reissued Letters Patent. Reissued June 20, 1911.

Original No. 988,817, dated April 4, 1911, Serial No. 573,569. Application for reissue filed May 6, 1911. Serial No. 625,557.

*To all whom it may concern:*

Be it known that I, CHARLES C. RICH, citizen of the United States, residing at Mount Vernon, in the county of Westchester and State of New York, have invented certain new and useful Improvements in Clutches, of which the following is a specification.

This invention comprehends certain new and useful improvements in clutches of the fluid type, and the invention has for its primary object a simple and durable construction of device of this character which will be composed of comparatively few parts that may be easily manufactured and assembled, and which will be efficient in operation to transmit power direct from a drive shaft to a driven shaft to rotate the latter within a wide range of gradation in speed, from the slowest up to the highest of which the engine rotating the drive shaft is capable.

The invention also has for its object an improved fluid controlled clutch embodying means whereby at one limit of its operative movement, the strain of transmission through the rotor casing of the clutch will be relieved to a considerable extent by a mechanical connection between said casing and an outer casing or shell which is splined on the driven shaft, as will be hereinafter more fully specified. And a further object of the invention is an improved clutch of this character which will be sensitive in its action and capable of being easily manipulated.

With these and other objects in view as will more fully appear as the description proceeds, the invention consists in certain constructions, arrangements and combinations of the parts that I shall hereinafter fully describe and claim.

Figure 1:
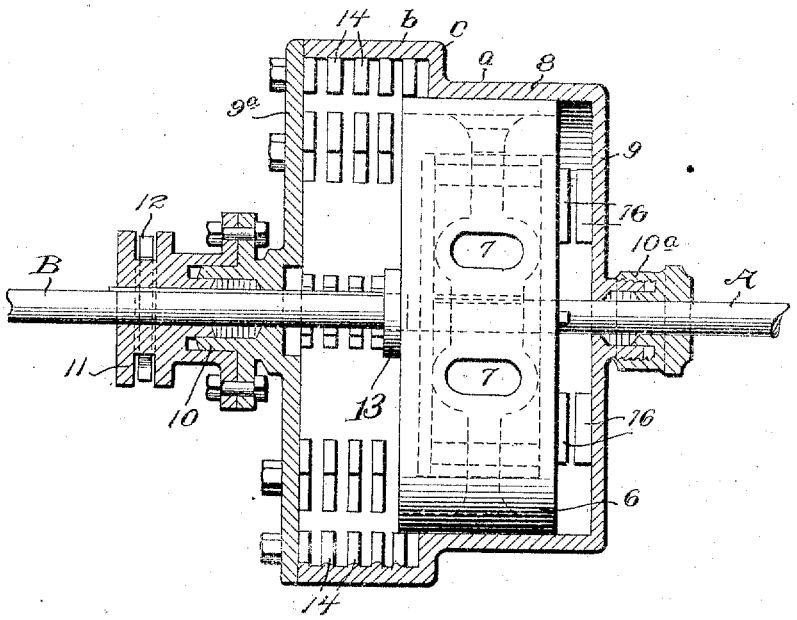
Figure 2:
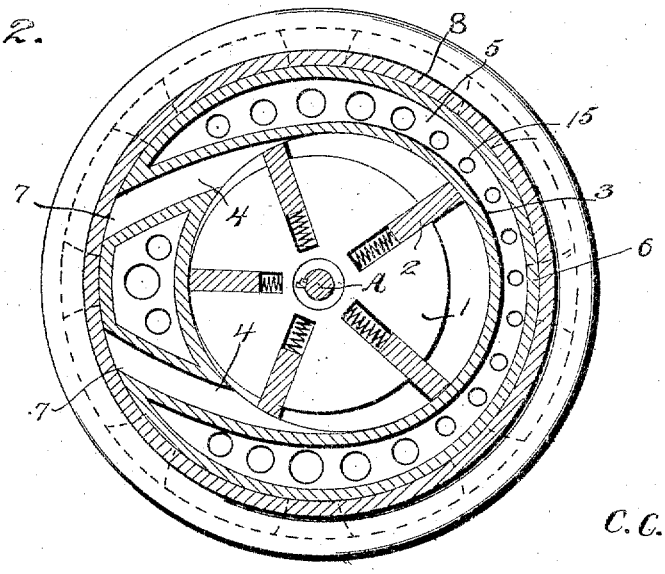

For a full understanding of the invention, reference is to be had to the following description and accompanying drawings, in which:

Figure 1 is a longitudinal sectional view of a clutch embodying the principles of my invention, parts being shown in elevation; and, Fig. 2 is a transverse sectional view.

Corresponding and like parts are referred to in the following description and indicated in all the views of the drawings by the same reference characters.

Referring to the drawing, A designates a drive shaft, and B a driven shaft, although it is to be understood that this selection is merely arbitrary and that either shaft may be the drive shaft and the other the driven shaft.

A rotor 1 is centrally mounted upon the drive shaft A and is provided with any desired number of blades 2, working within the chamber formed by the rotor casing 3, said rotor being eccentrically disposed in said chamber, as clearly illustrated in Fig. 2. 4 designates the inlet and outlet passages leading to and from the cylindrical chamber of the rotor casing 3, said passages being spaced from each other any desired distance.

Secured to or formed integrally with the rotor casing 3 is a radially disposed circular web 5 provided at its outer edge with a laterally widened rim 6 bearing a concentric relation to the shaft A, and formed with preferably laterally widened ports 7 registering with and practically forming parts of the passages 4. This rim 6 is encircled by the cylindrical body portion 8 of a shell casing C which may be formed in any desired number of parts divided either longitudinally or transversely or both and connected together in any desired way so as to form a complete housing for the rim 6 and its inclosed parts. In the present instance, the body portion 8 of the shell casing C is formed at one end with an integral head 9 and at its opposite end with a removable head $9^a$ secured in place by stud bolts or similar fastening devices. The casing C is splined on the shaft B for a limited longitudinal movement thereon and is provided at its ends with stuffing boxes 10, $10^a$, through which the respective shafts A and B pass, as clearly illustrated in Fig. 1. It is to be understood that the casing C may be moved by any desired means, being shown in the present instance as provided with a grooved collar 11 engaged by the yoke 12 of a shipper lever.

The rotor 1 is keyed to the drive shaft A, and the rotor casing 3 is keyed through its hub 13 to the driven shaft B. The body portion 8 of the shell casing C embodies two integrally connected parts designated (*a*) and (*b*) respectively, said parts being preferably equal in width. The part (*a*) is imperforate and has a perfectly smooth interior wall snugly incasing the smooth exterior wall or face of the rim 6, whereby when the shell casing C is moved in one direction, the interior wall of the portion (*a*) will close the ports and passages leading to and from the interior of the rotor casing 3 and consequently the rotor 1 and its casing will rotate as a unit and operatively connect the driven shaft to the drive shaft. The part (*b*) of the shell casing C is of larger interior diameter than the part (*a*) and is formed on its interior wall with any desired number of laterally extending webs 14, the inner circle of which coincides with the inner wall of the part (*a*), whereby a longitudinal movement of the shell casing C in a direction opposite to that above mentioned will cause the inner edges of the webs 14 to ride smoothly upon the rim 6 of the rotor casing 3, thereby maintaining the shell casing C in a properly guided movement. The webs 14 are formed with any desired number of openings extending therethrough, preferably across their inner edges, and hence it will be understood that a movement of the shell casing C to the right as viewed in Fig. 1, will uncover the ports and passages leading from and into the interior of the rotor casing 3, whereupon the rotor and its casing may turn independently with the result that the shafts A and B will be uncoupled. It is evident that this movement of the shell casing C in a longitudinal direction either way, may be a gradual one and be stopped at any desired point so as to uncover more or less of the ports 7, thereby transmitting power from the drive shaft A to the driven shaft B to rotate the latter at varying speeds. In order to provide for displacement and permit the relatively easy movement of the shell casing C, the web 5 is formed with any desired number of ports 15 extending therethrough, as shown.

As stated at the outset of the description, it is one of the main objects of my invention to provide means whereby, when the clutch is fully in or engaged, the strain of transmission through the rotor casing 3 is relieved by being largely taken up and transmitted by and through the shell casing C, which is splined on the driven shaft B, to which same shaft the rotor casing 3 is secured, the rotor casing 3 and shell casing C being mechanically connected together. As one means for accomplishing this result, I provide the rotor casing 3 at one end, and the shell casing C at the adjoining end, with complemental lugs 16, of any desired number and formation, whereby when the shell casing C is moved fully over to the left as viewed in Fig. 1, these lugs or abutments will interengage and thereby mechanically connect together the two casings.

It is to be understood that my invention is not limited to the exact formation of the recessed webs 14 shown in the accompanying drawing, but that said webs may be recessed in any desired way and assume any desired position so as to insure uniform wear on the outer bearing surface of the rotor casing 3; that the invention is not limited to any particular form of rotor and blades nor to any particular formation, construction or arrangement of the interengaging abutments 16; and that, as before indicated, any means may be employed for shifting the shell casing C. For instance, if the clutch is used on an automobile or the like, merely as a clutch device and not as a speed regulating device, it will probably be preferable to actuate the clutch through the medium of a foot lever; but when speed changing gears are eliminated, as they may well be when my invention is employed (the same being adaptable for use either in connection with speed changing gears or in lieu thereof) it will in all probability be preferred to control the device by a hand lever and quadrant or similar element, so that it may be easily held in fixed position and easily shifted. Obviously, in this last named arrangement, the device may be also connected to a foot lever to admit of instantly throwing out the clutch without shifting the lever. The clutch can then be thrown in again by the foot pedal without reference to the position of the hand lever.

Having thus described the invention, what is claimed as new is:

1. A clutch of the character described, comprising, in combination with drive and driven shafts, a rotor connected to the drive shaft, a rotor casing connected to the driven shaft and formed with inlet and outlet ports, and a shell casing inclosing and surrounding the rotor casing and embodying two parts, one of which is adapted to close said ports and the other of which is designed to establish communication between the ports, the shell casing having a longitudinally sliding movement on the driven shaft.

2. A clutch of the character described, comprising, in combination with drive and driven shafts, a rotor connected to the drive shaft, a rotor casing connected to the driven shaft and formed with inlet and outlet ports, and a shell casing surrounding said rotor casing and embodying two parts, one of which is adapted to close said ports, the other part of the shell casing being formed with webs adapted to slip over the rotor casing, the webs being formed with openings arranged to establish communication between the ports of the rotor casing, the shell casing being mounted for a longitudinally sliding movement on the driven shaft.

3. A clutch of the character described, comprising, in combination with drive and driven shafts, a rotor secured to the drive shaft, a rotor casing connected to the driven shaft, and formed with inlet and outlet ports, and a shell casing surrounding the rotor casing and embodying a part which is adapted to close said ports, and another part of relatively large interior diameter formed with webs adapted to snugly slip over the rotor casing, the webs being formed in their inner edges with recesses adapted to establish communication between said ports.

4. A clutch of the character described, comprising a rotor, a shaft to which the rotor is connected, a rotor casing in which the rotor is mounted, said casing being formed with inlet and outlet ports, with an apertured web and a surrounding rim concentrically disposed relative to the shaft, the casing being arranged for connection to a shaft, a shaft to which the rotor casing is connected, and a shell casing mounted for a longitudinally sliding movement on said last named shaft and surrounding said rim, said shell casing embodying a part adapted to close said ports and another part formed with webs having openings therethrough, the series of webs being of the same interior diameter as the first named part of the shell casing, and being arranged to establish communication between the ports of the rotor casing.

5. A clutch of the character described, comprising a rotor, a rotor casing provided with inlet and outlet ports, a shiftable shell casing surrounding the rotor casing and adapted to control the communication between said inlet and outlet ports, and means for mechanically connecting together the two casings.

6. A clutch of the character described, comprising a rotor, a rotor casing, shafts to which the rotor and its casing are respectively connected, the casing being formed with inlet and outlet ports, a shell casing having a longitudinally sliding connection with the shaft to which the rotor casing is connected and arranged to control the opening and closing of said ports, the two casings being formed with lugs adapted to interengage upon the movement of the shell casing to close said ports, whereby to mechanically connect the two casings.

7. A clutch of the character described, comprising a rotor, a rotor casing provided with inlet, and outlet ports, and a shiftable shell casing surrounding the rotor casing and adapted to control the communication between the inlet and outlet ports.

8. A clutch of the character described, comprising a rotor, a shaft to which the rotor is connected, a rotor casing in which the rotor is mounted, said casing being formed with inlet and outlet ports, a shaft to which said rotor casing is connected, and a shiftable shell casing having a longitudinally sliding movement on said shafts.

In testimony whereof, I affix my signature in presence of two witnesses.

CHARLES CLAYTON RICH. [L. S.]

Witnesses:

LOUIS YOUNG,

CHAS. C. HOWARD.